United States Patent [19]

Shapess

[11] Patent Number: 4,461,157
[45] Date of Patent: Jul. 24, 1984

[54] GROUND WATER HEAT PUMP SYSTEM FOR LOW YIELD WELL

[75] Inventor: Robert P. Shapess, Cata, N.Y.

[73] Assignee: Snyder General Corporation, Dallas, Tex.

[21] Appl. No.: 345,293

[22] Filed: Feb. 3, 1982

[51] Int. Cl.³ ............................................. F25B 27/02
[52] U.S. Cl. ..................................... 62/238.6; 62/260; 165/45
[58] Field of Search .......................... 165/45, DIG. 12; 62/260, 235.1, 238.6; 126/400; 166/302

[56] References Cited

U.S. PATENT DOCUMENTS

| | | |
|---|---|---|
| 2,167,878 | 8/1939 | Crawford . |
| 2,438,720 | 3/1948 | Smith . |
| 2,461,449 | 2/1949 | Smith et al. . |
| 2,503,456 | 4/1950 | Smith . |
| 2,513,373 | 7/1950 | Sporn et al. . |
| 2,572,356 | 10/1951 | Krueger . |
| 3,965,972 | 6/1976 | Petersen ........................ 62/260 X |
| 4,327,555 | 5/1982 | Dimon ........................... 62/260 X |

OTHER PUBLICATIONS

Popular Science, Well Water Heat Pumps, Feb. 1978, p. 81.

Primary Examiner—Albert J. Makay
Assistant Examiner—Henry Bennett
Attorney, Agent, or Firm—Hubbard, Thurman, Turner & Tucker

[57] ABSTRACT

A heat pump system utilizing water for heat transfer purposes from a well having a continuous supply rate capability which is less than that required by the heat pump of the system is arranged to provide for the continuous return to the well of a portion of pump discharged water as required to stabilize the level of water in the well.

8 Claims, 2 Drawing Figures 4,461,157

GROUND WATER HEAT PUMP SYSTEM FOR LOW YIELD WELL

BACKGROUND OF THE INVENTION

1. Field of the Invention

The invention relates to heat pump systems and more especially, to heat pump systems obtaining water for heat transfer purposes from a ground well.

2. Description of the Prior Art

Ground water from a well has been used heretofore in heat pump systems to add heat to the refrigerant of a heat pump when used for environmental heating, and to subtract heat therefrom when used for cooling purposes. However, the use of ground water in the heat pump systems of the prior art has frequently been limited by the fact that many wells are low yield wells incapable of continuously supplying water at the flow rate which these systems required.

It is a prime object of the present invention to provide a ground water heat pump system which increases the flow rate capability of a low yield well as required to provide a stabilized water source that can deliver water as needed for heat transfer purposes by the heat pump of the system.

It is another object of the invention in a ground water heat pump system to maintain the level of a supply well constant with feed back water returned to the well from the discharge side of the heat pump.

Other objects and advantages of the invention will become apparent during a reading of the specification taken in connection with the accompanying drawings.

SUMMARY OF THE INVENTION

In accordance with the invention, a ground water heat pump system requiring water for the heat pump at a flow rate which is greater than the supply capability of a well serving as a water source is provided with a feed back line through which a portion of the water discharged from the heat pump is returned to the well as required to stabilize the level of the water in the well. The remainder of the water discharged from the heat pump is otherwise disposed of through suitable piping. In one form of the invention, the remainder of the water flows through a line leading to a dry well, pond, drainage ditch or the like. In another form of the invention, the remainder of the pump discharged water is caused to flow through a line to a domestic storage tank whenever pressure in the tank falls below a defined amount, and is at other times permitted to escape through the line leading to the dry well, pond, drainage ditch or the like.

DESCRIPTION OF THE PREFERRED EMBODIMENT

Figure 1:
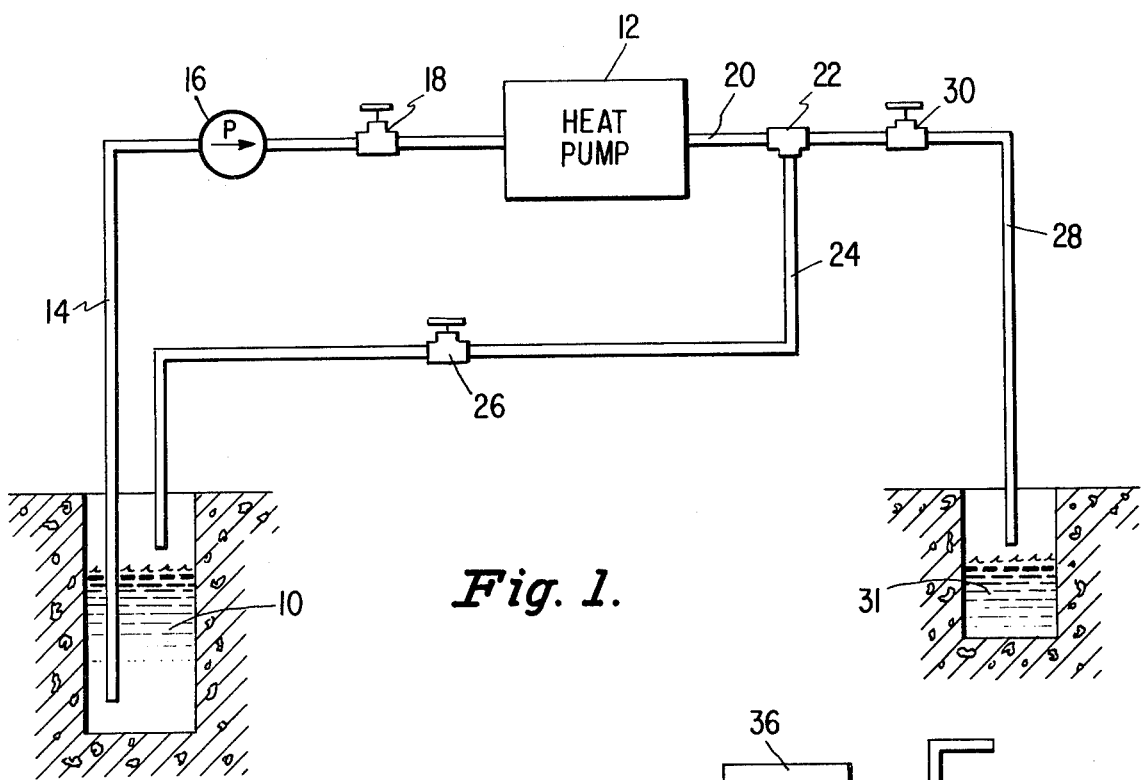
FIG. 1 is a diagrammatic illustration showing the ground water heat pump system according to the invention.

Referring to FIG. 1 of the drawings, showing a ground water heat pump system according to the invention, reference character 10 designates a low yield well from which it is desired to obtain water for a conventional refrigerant cycling heat pump 12 requiring water for heat transfer purposes in excess of what the well can supply without being depleted. As shown, such system includes a supply line 14 which connects the well through a water pump 16 and adjustable valve 18 with the heat pump. The system further includes a heat pump discharge line 20 which connects the heat pump through a T 22 with a well feed back line 24 including an adjustable valve 26, and with a line 28 including an adjustable valve 30. Line 28 leads to a dumping site. As illustrated in FIG. 1, line 28 extends to a dry well 31, however, line 28 could just as well extend to a pond, drainage ditch or the like.

The water pump and heat pump are energized from a common electrical source through circuitry not shown, which causes the water pump to be set into operation whenever the heat pump is turned on and deliver water from the well through supply line 14 to the heat pump 12 which discharges the water into line 20. Some of the water in discharge line 20 is returned to the well through feed back line 24 and the rest is permitted to escape through line 28. The amount of water which flows through the various lines of the system is predetermined by the setting of valves 18, 26 and 30 to meet heat pump requirements.

A high rate of flow of water, such as is required through heat pump 12 serving as a heating unit to prevent the refrigerant in the heat pump from becoming so cold as to prevent proper operation of the heat pump, is obtainable from low yield well 10 with valve 18 opened sufficiently for such flow, and with valves 26 and 30 set to divide the flow of water leaving heat pump discharge line 20 in such a manner as to cause water to be returned through feed back line 24 to the well at a rate just sufficient to make up for the discrepency in the supply capability of the well while the rest of the water is disposed of through line 28. Assuming, by way of example, that the heat pump requires water at the rate of ten gallons per minute (10 GPM) and the well can only add 5 GPM to the system without being depleted, the valves are set to cause 10 GPM to be delivered to the heat pump, 5 GPM to be returned to the well through line 24, and 5 GPM to be otherwise disposed of through line 28. As a consequence of the return of water at the rate of 5 GPM to the well, the level of water in the well is stabilized at close to its original level. The temperature of the water in the well stabilizes at several degrees less than ground water temperature.

The system of the invention can be used with the heat pump 12 serving as a cooling unit, in which case less water is required by the heat pump. Once again, the valves would be adjusted to cause the required flow to be delivered through the heat pump, some of the heat pump discharged water to be fed back to the well 10 if required to stabilize the level therein and the rest of the water to be discharged from line 28.

Figure 2:
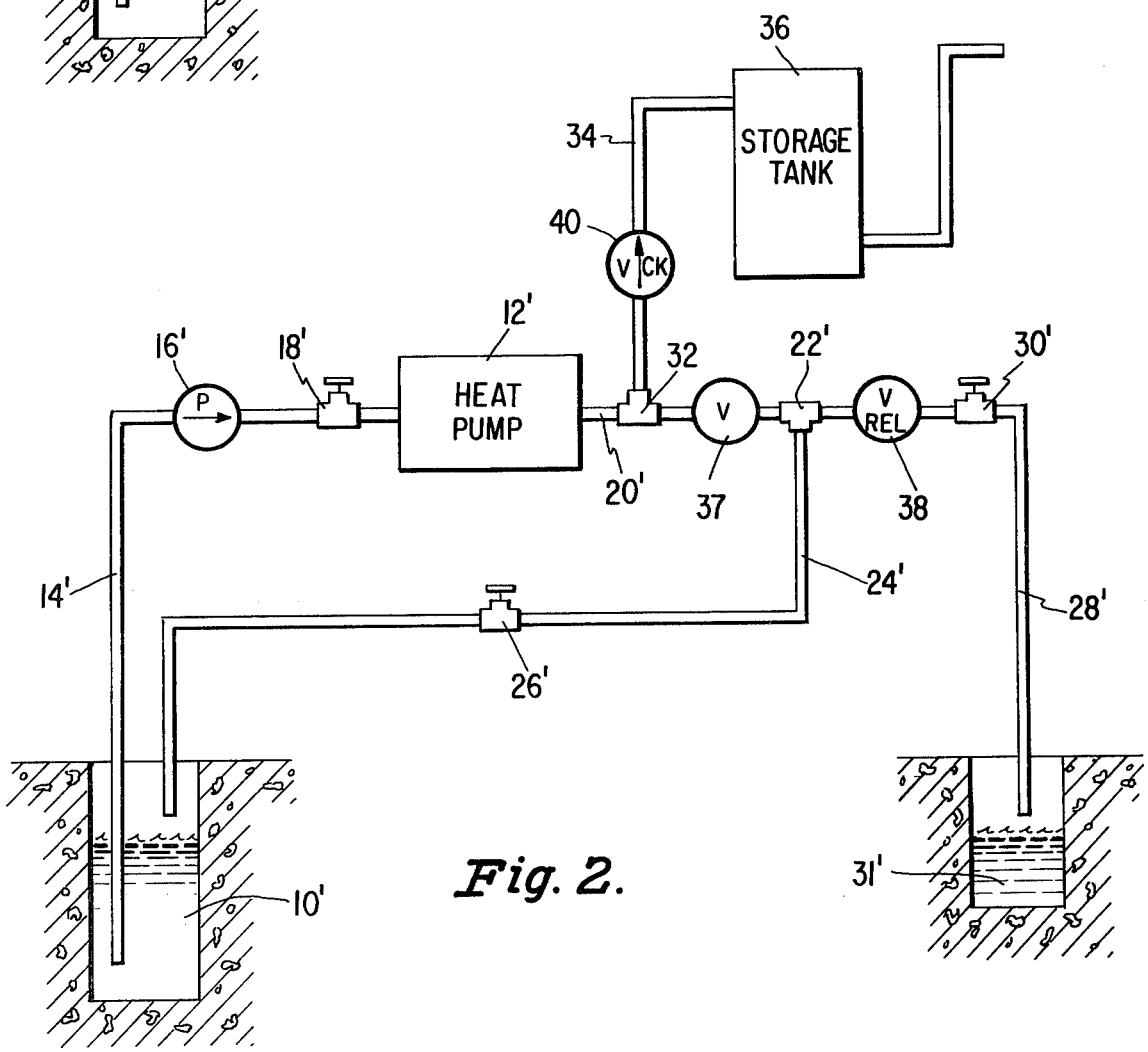
FIG. 2 is a diagrammatic illustration showing a modified form of the ground water heat pump system of FIG. 1.

Referring to FIG. 2 wherein a modified form of the system of the invention is shown, and wherein parts corresponding to those in FIG. 1 are numbered with like reference characters having an added prime mark ('), there may be seen a low yield well 10', heat pump 12', a supply line 14' connecting the well 10' through water pump 16' and a valve 18' with the heat pump, and a heat pump discharge line 20' which connects with a well feed back line 24' including valve 26' and with a line 28' including valve 30'. Discharge line 20' connects with feed back line 24' and line 28' through T-fitting 22'. As shown, the discharge line is also connected through a T-fitting 32 with a line 34 extending to a domestic water storage tank 36, and a flow valve 37 has been included in line 20 between the T-fittings 22' and 32 to automatically regulate or control water flow as may be required for heat pump operation. Line 28' includes a pressure relief valve 38 in addition to adjustable valve 30', and line 34 includes a check valve 40. The system of FIG. 2 functions in a similar manner to that already described for the system of FIG. 1, except that heat pump discharged water which is not returned to the well by way of feed back line 24' is used to charge tank 36 whenever pressure within the tank is less than a desired predetermined value corresponding to the setting of pressure relief valve 38. Whenever the desired pressure is exceeded, the relief valve opens all of the heat pump discharged water not returned to the well escapes through line 28'. In connection with the system of FIG. 2, suitable circuitry would be provided for setting the water pump 16' into operation whenever either the heat pump 12' is turned on, or pressure in the water storage tank falls below the desired predetermined value.

It is to be understood that the present disclosure relates to preferred embodiments of the invention which are for purposes of illustration only and are not to be construed as limiting the invention. Numerous alterations and modifications will suggest themselves to those skilled in the art, and all such modifications which do not depart from the spirit and scope of the invention are intended to be included within the scope of the appended claims.

I claim:

1. A ground water heat pump system comprising a well, a heat pump requiring ground water from said well for heat transfer between said heat pump and said ground water at a rate greater than the ground water supply capability of said well, a supply line connecting said well with said heat pump, a water pump for delivering ground water from said well by way of said supply line to said heat pump, a discharge line into which ground water is discharged by said heat pump after heat transfer between said heat pump and said ground water, a feedback line interconnecting said discharge line and said well for returning some of the discharged ground water directly back to said well from which said ground water is delivered to mix with water flowing into said well from the ground to prevent depletion of the ground water supply capability of said well, and piping for otherwise disposing of the rest of the discharged ground water at a site other than said well.

2. A ground water heat pump system as defined in claim 1 including control means for causing ground water to be returned to said well through the feedback line at a rate substantially equal to the difference between said required rate for said heat pump and the ground water supply rate capability of said well, and causing ground water to flow through said piping at a rate substantially equal to the difference between said required rate and the return rate.

3. A ground water heat pump system as defined in claim 2 wherein the control means includes an adjustable valve in the supply line, another adjustable valve in the feedback line and still another adjustable valve in said piping.

4. A ground water heat pump system as defined in claim 1 wherein said piping includes a line extending to a disposal site where ground water withdrawn from said well is permitted to escape from the sytem into a another well.

5. A ground water heat pump system as defined in claim 1 which includes a water storage tank, and wherein said piping includes a line extending to the storage tank and a line extending to a disposal site where ground water can escape from the system.

6. A ground water heat pump system as defined in claim 5 including a pressure relief valve in the said line extending to a disposal site.

7. A ground water heat pump system as defined in claim 5 including control means for causing ground water withdrawn from said well to be returned to said well through the feedback line at a rate substantially equal to the difference between the said required rate for said heat pump and the ground water supply rate capability of said well, and for causing ground water to flow at a rate substantially equal to the difference between said required rate and the return rate through the line extending to the storage tank when tank pressure is less than a predetermined amount but through the line extending to the disposal site where ground water can escape from the system when the tank pressure is greater than the said predetermined amount.

8. A ground water heat pump system as defined in claim 7 wherein the control means includes an adjustable valve in the supply line, another adjustable valve in the feedback line, and another adjustable valve along with a pressure relief valve in the said line through which ground water can escape from the system.

* * * * *